United States Patent
Hashimoto et al.

(10) Patent No.: US 8,476,780 B2
(45) Date of Patent: Jul. 2, 2013

(54) WIND TURBINE GENERATOR AND METHOD OF ESTIMATING WIND DIRECTION IN WIND TURBINE GENERATOR

(75) Inventors: Masayuki Hashimoto, Nagasaki (JP); Tsuyoshi Wakasa, Nagasaki (JP); Takatoshi Matsushita, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 293 days.

(21) Appl. No.: 12/999,333

(22) PCT Filed: Nov. 10, 2009

(86) PCT No.: PCT/JP2009/069105
§ 371 (c)(1),
(2), (4) Date: Dec. 16, 2010

(87) PCT Pub. No.: WO2010/076860
PCT Pub. Date: Jul. 8, 2010

(65) Prior Publication Data
US 2011/0101691 A1    May 5, 2011

(30) Foreign Application Priority Data
Jan. 5, 2009   (JP) ................................ 2009-000398

(51) Int. Cl.
*F03D 9/00*   (2006.01)
*H02P 9/04*   (2006.01)
*F03B 13/00*   (2006.01)
*F03B 13/10*   (2006.01)

(52) U.S. Cl.
USPC .................... 290/44; 290/43; 290/54; 290/55

(58) Field of Classification Search
USPC .......................................... 290/43, 44, 54, 55
See application file for complete search history.

(56) References Cited

U.S. PATENT DOCUMENTS
6,320,272 B1   11/2001   Lading et al.
6,946,751 B2 *   9/2005   Yoshida et al. ................. 290/44
(Continued)

FOREIGN PATENT DOCUMENTS
EP   1959130 A   8/2008
JP   2005-16417 A   1/2005
(Continued)

OTHER PUBLICATIONS

Korean Office Action dated Jun. 20, 2012 from Korean Application No. 10-2011-7001042 with partial English translation.

(Continued)

*Primary Examiner* — Pedro J Cuevas
(74) *Attorney, Agent, or Firm* — Kanesaka Berner & Partners, LLP (57) ABSTRACT

Yaw control is performed such that a nacelle faces into an actual main wind direction. The actual wind direction is estimated by detecting the main wind direction with an anemoscope (wind direction detecting means), assuming the actual wind direction by assuming a wind direction offset value, which is a deviation between the main wind direction and the actual wind direction, which is a direction of wind which blows in actual use, at a predetermined wind speed with a wind direction assuming unit (wind direction assuming means), calculating an average generator output power for a predetermined period of time in the assumed actual wind direction with an average-generator-output-power calculation unit (average-generator-output-power calculation means), approximating the average generator output power with respect to the assumed wind direction offset value to a quadratic curve with an actual wind direction estimation unit (actual wind direction estimation means), and estimating the wind direction offset value at the time when the average generator output power is the maximum in the approximated quadratic curve to be an actual offset value.

2 Claims, 8 Drawing Sheets

U.S. PATENT DOCUMENTS

| | | | | |
|---|---|---|---|---|
| 7,622,816 B2 * | 11/2009 | Stahlkopf | ................ | 290/44 |
| 7,728,451 B2 * | 6/2010 | Ichinose et al. | ................ | 290/44 |
| 8,025,476 B2 * | 9/2011 | Zheng et al. | ................ | 415/1 |
| 8,120,194 B2 * | 2/2012 | Hoffmann et al. | ................ | 290/44 |
| 8,150,641 B2 * | 4/2012 | Morjaria et al. | ................ | 702/60 |
| 2004/0183307 A1 * | 9/2004 | Yoshida et al. | ................ | 290/44 |
| 2007/0035135 A1 * | 2/2007 | Yoshida | ................ | 290/44 |
| 2007/0205602 A1 * | 9/2007 | Willey et al. | ................ | 290/44 |
| 2008/0143111 A1 * | 6/2008 | Ichinose et al. | ................ | 290/44 |
| 2010/0078940 A1 * | 4/2010 | Kondo et al. | ................ | 290/44 |
| 2010/0301607 A1 * | 12/2010 | Morimoto | ................ | 290/44 |
| 2010/0320772 A1 * | 12/2010 | Efratyi | ................ | 290/55 |
| 2012/0169053 A1 * | 7/2012 | Tchoryk et al. | ................ | 290/44 |
| 2012/0175878 A1 * | 7/2012 | Wickstrom | ................ | 290/44 |
| 2013/0033040 A1 * | 2/2013 | Bowyer et al. | ................ | 290/44 |

FOREIGN PATENT DOCUMENTS

| | | | |
|---|---|---|---|
| JP | 2006-125265 A | | 5/2006 |
| JP | 2008-291786 A | | 12/2008 |
| JP | 2010156317 A | * | 7/2010 |
| WO | 2008/146604 A1 | | 12/2008 |

OTHER PUBLICATIONS

Japanese Decision to Grant Patent for JP2009-000398, dated Apr. 17, 2012.

International Search Report of corresponding application No. PCT/JP2009/069105 mailed Feb. 16, 2010.

Decision to Grant as issued on Mar. 6, 2013 in corresponding Chinese Patent Application No. 200980127171.8.

* cited by examiner

WIND TURBINE GENERATOR AND METHOD OF ESTIMATING WIND DIRECTION IN WIND TURBINE GENERATOR

RELATED APPLICATIONS

The present application is based on International Application Number PCT/JP2009/069105, filed Nov. 10, 2009, and claims priority from Japanese Application Number 2009-000398, filed Jan. 5, 2009, the disclosures of which are hereby incorporated by reference herein in their entirety.

TECHNICAL FIELD

The present invention relates to wind turbine generators, and, more specifically, to wind turbine generators in which the orientation of nacelles is variably controlled so as to follow the wind direction.

BACKGROUND ART

Up-wind type wind turbine generators have a rotor head, which includes a nacelle mounted on a tower and blades attached thereto, and a generator driven by shaft output power of the rotor head. In the wind turbine generators having such a configuration, the blades receive wind power, and the blades and the rotor head are rotated, which is transmitted to the generator. Thus, using the shaft output power obtained by converting wind power to rotary power as the driving source of the generator, power generation using wind power as the motive power of the generator can be performed.

In the wind turbine generators of this type, the generator output power varies depending on the wind speed and the wind direction. Therefore, U.S. Pat. No. 6,320,272 (PTL 1) discloses a technique in which a laser anemometer is used to estimate the wind speed to ascertain the power generating performance of the wind turbine generator.

Furthermore, in the wind turbine generators of this type, in order to utilize the wind energy as much as possible, an anemoscope is mounted on the top of the nacelle so that yaw control is performed such that the nacelle faces into the main wind direction detected by this anemoscope.

However, because the anemoscope is mounted on the top of the nacelle, that is, behind the blades, the anemoscope is located downstream of the blades in the wind direction. Thus, the rotation of the blades changes the wind direction, causing a deviation between the main wind direction detected by the anemoscope and an actual direction of main wind blowing against the blades. As a result, the wind turbine generator generates power when it is deviated with the actual main wind direction. Since the rotational energy given by the wind decreases as the deviation with the wind direction increases, there is a problem in that the generator output power of the wind turbine generator decreases because of the deviation with the wind direction. Furthermore, there is also a problem in that an unbalanced load is applied to the wind turbine generator because of the deviation with the wind direction.

CITATION LIST

Patent Literature

{PTL 1} U.S. Pat. No. 6,320,272

SUMMARY OF INVENTION

Technical Problem

The present invention has been made to overcome the above-described problems, and an object thereof is to provide a wind turbine generator in which yaw control can be performed such that the nacelle faces into the actual wind direction.

Solution to Problem

To overcome the above-described problems, the present invention employs the following solutions.

An aspect of the present invention is a wind turbine generator in which an orientation of a nacelle is variably controlled so as to follow a wind direction, the wind turbine generator including: a wind direction detecting means that detects a main wind direction; a wind direction assuming means that assumes an actual wind direction, which is a direction of wind which blows in actual use, by assuming a wind direction offset value, which is a deviation between the main wind direction and the actual wind direction, at a predetermined wind speed; an average-generator-output-power calculation means that calculates an average generator output power for a predetermined period of time in the actual wind direction which has been assumed; and an actual wind direction estimation means that estimates the actual wind direction by approximating the average generator output power with respect to the wind direction offset value which has been assumed to a quadratic curve and estimating the wind direction offset value at the time when the average generator output power is the maximum in the quadratic curve which has been approximated to be the actual offset value.

Furthermore, another aspect of the present invention is a method of estimating wind direction in a wind turbine generator in which an orientation of a nacelle is variably controlled so as to follow a wind direction, the method including: a step of detecting a main wind direction; a step of assuming an actual wind direction, which is a direction of wind which blows in actual use, by assuming a wind direction offset value, which is a deviation between the main wind direction and the actual wind direction, at a predetermined wind speed; a step of calculating an average generator output power for a predetermined period of time in the actual wind direction which has been assumed; and a step of estimating the actual wind direction by approximating the average generator output power with respect to the wind direction offset value which has been assumed to a quadratic curve and estimating the wind direction offset value at the time when the average generator output power is the maximum in the approximated quadratic curve to be an actual offset value.

According to the above-described aspect of the present invention, because there is a deviation between the main wind direction detected by the wind direction detecting means and the actual wind direction, which the direction of wind actually blowing against the wind turbine generator, the wind direction offset value, which is the deviation, is assumed. Meanwhile, the wind direction offset value varies depending on the rotational speed of the blades of the wind turbine generator. In particular, in the wind turbine generator in which the rotational speed of the blades changes as the wind speed changes, like the wind turbine generator according to this embodiment, it is regarded that the rotational speed of the blades corresponds to the wind speed, and, when the wind direction offset value is assumed, the estimation target is determined with respect to a predetermined wind speed. This predetermined wind speed may be arbitrarily determined. Then, when it is assumed that there is a deviation between the detected main wind direction and the actual wind direction, that is, by assuming the actual wind direction from the detected main wind direction and the wind direction offset value at a predetermined wind speed, the average generator output power for a predetermined period of time at a predetermined wind speed and in the assumed actual wind direction is calculated. The predetermined period of time herein may be arbitrarily determined. From the calculated average generator output power, the average generator output power with respect to the wind direction offset value is approximated to a quadratic curve using, for example, the least squares or gradient method. Then, the wind direction offset value at the time when the average generator output power is the maximum in this quadratic curve is estimated to be the actual wind direction offset value, and by adding the offset value to the main wind direction, the actual wind direction is estimated.

Advantageous Effects of Invention

In this manner, according to the present invention, by estimating the actual direction of wind blowing against the wind turbine generator, yaw control can be performed such that the nacelle faces into the actual main wind direction. Thus, the power generating performance of the wind turbine generator improves.

DESCRIPTION OF EMBODIMENTS

Each of embodiments of the wind turbine generator according to the present invention will be described below with reference to the drawings.

First Embodiment

Figure 1:
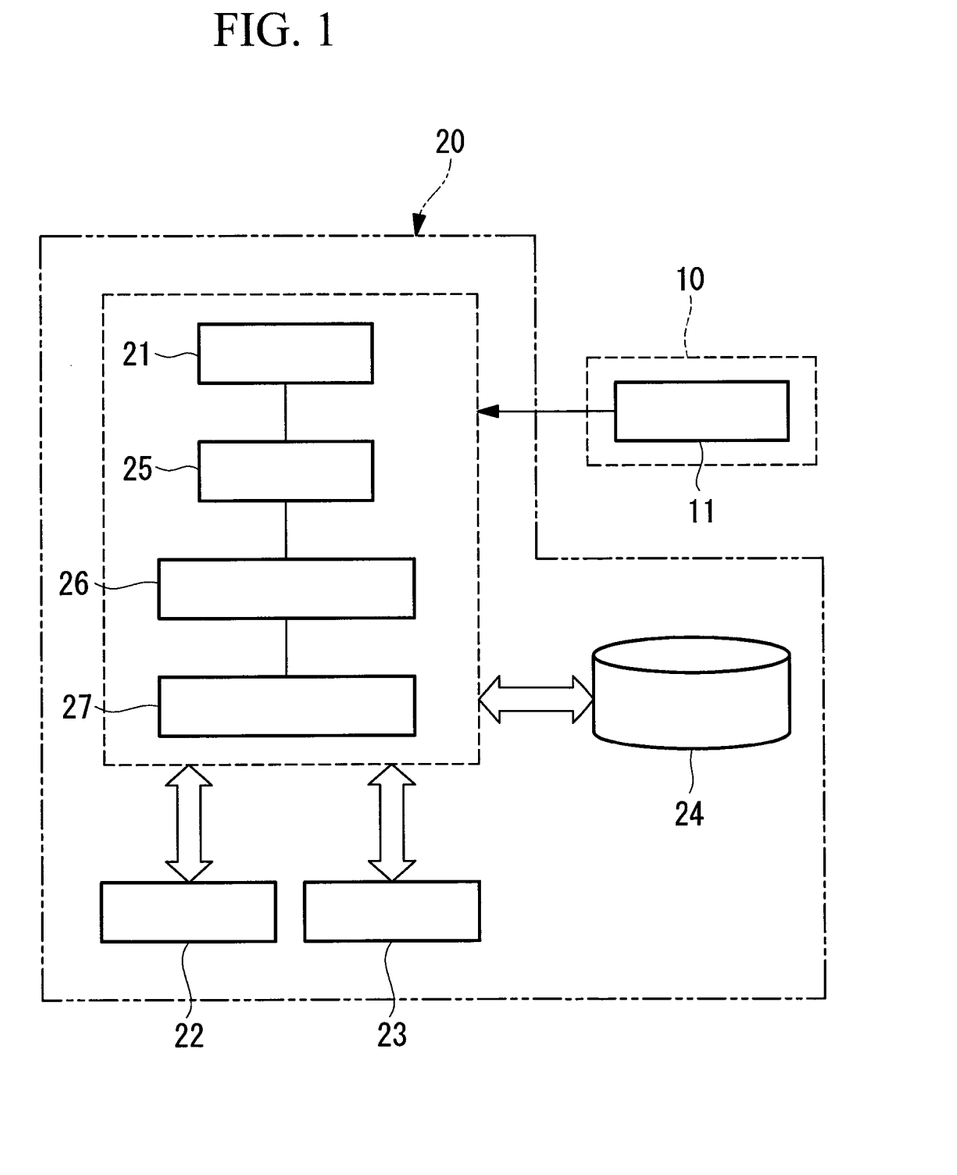
FIG. 1 is a block diagram showing, in outline, the schematic configuration of a wind turbine generator of the present invention.

FIG. 1 is a block diagram showing the schematic configuration of a wind turbine generator of the present invention. As shown in FIG. 1, the wind turbine generator includes an anemoscope 11, serving as wind direction detecting means, on the top of a nacelle 10. This anemoscope detects the direction of wind blowing against the wind turbine generator and outputs the detected wind direction to a calculation unit 20.

The calculation unit 20 performs calculation to estimate the actual wind direction and includes a CPU (central processing unit) 21 that performs various processing; a ROM (Read Only Memory) 22, which is a memory that allows only reading operations and stores a basic program and the like; a RAM (Random Access Memory) 23, which is a memory that allows both reading and writing operations and serves as a work area for the CPU 21; and a storage device 24 that stores programs and various data.

The calculation unit 20 also includes a wind direction assuming unit 25 serving as wind direction assuming means, an average-generator-output-power calculation unit 26 serving as average-generator-output-power calculation means, and an actual wind direction estimation unit 27 serving as actual wind direction estimation means. The wind direction assuming unit 25 assumes the actual wind direction, which is a direction of wind which blows in actual use, by assuming a wind direction offset value, which is a deviation between the main wind direction and the actual wind direction, at a predetermined wind speed. The average-generator-output-power calculation unit 26 calculates the average generator output power for a predetermined period of time in the assumed actual wind direction. The actual wind direction estimation unit 27 estimates the actual wind direction by approximating the average generator output power with respect to the assumed wind direction offset value to a quadratic curve and estimating the wind direction offset value at the time when the average generator output power is the maximum in the approximated quadratic curve to be an actual offset value.

The wind direction assuming unit 25, the average-generator-output-power calculation unit 26, and the actual wind direction estimation unit 27 are all processing units that are realized by the CPU 21 executing processing programs stored in the predetermined ROM 22. The processing thereof will be described below.

Figure 2:
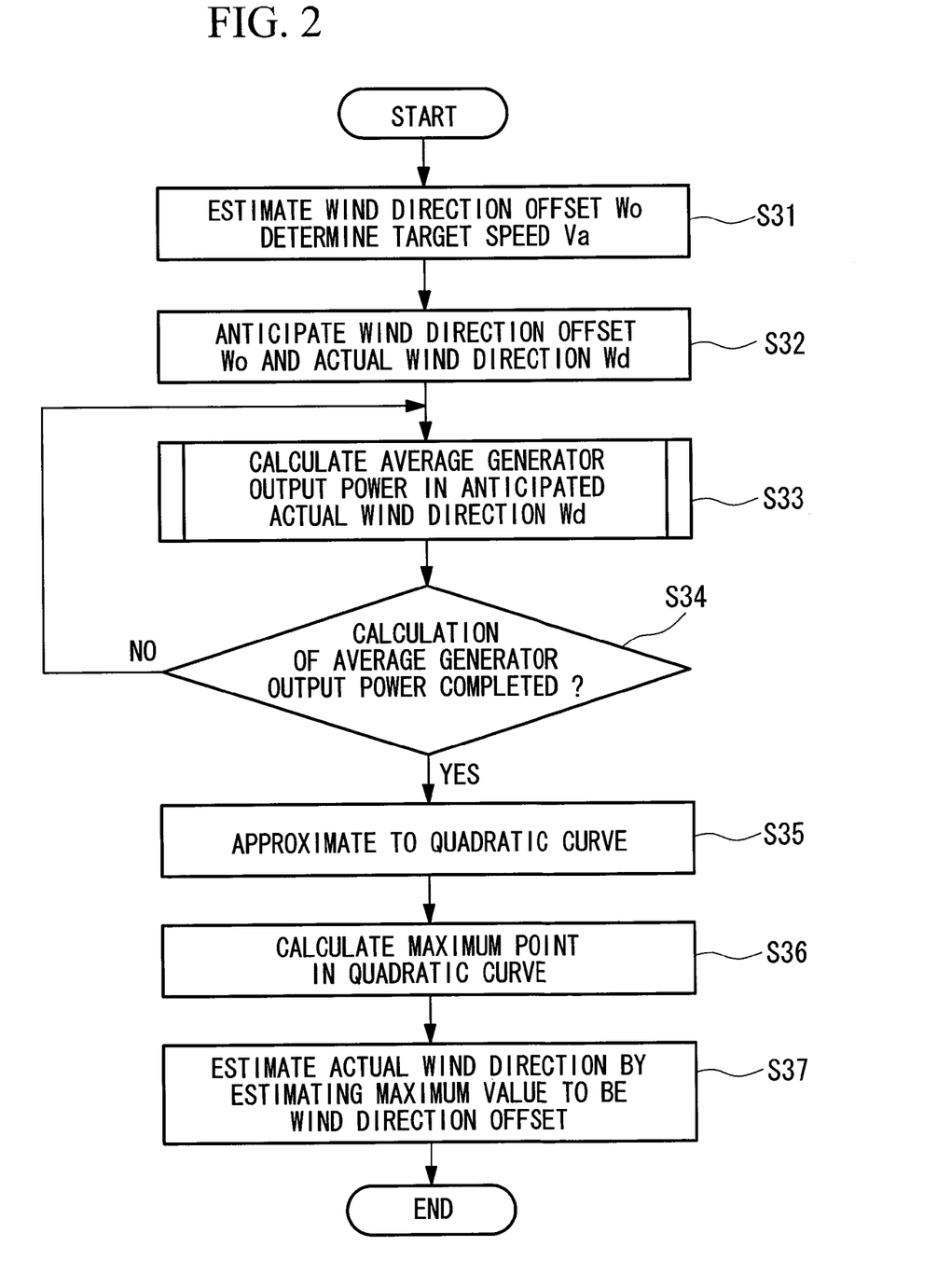
FIG. 2 is a flowchart showing wind-direction estimation processing according to a first embodiment of the present invention.

Next, processing steps in a method of estimating wind direction in the wind turbine generator according to the present invention will be described. FIG. 2 is a flowchart showing processing steps in the method of estimating wind direction according to this embodiment.

Figure 3:
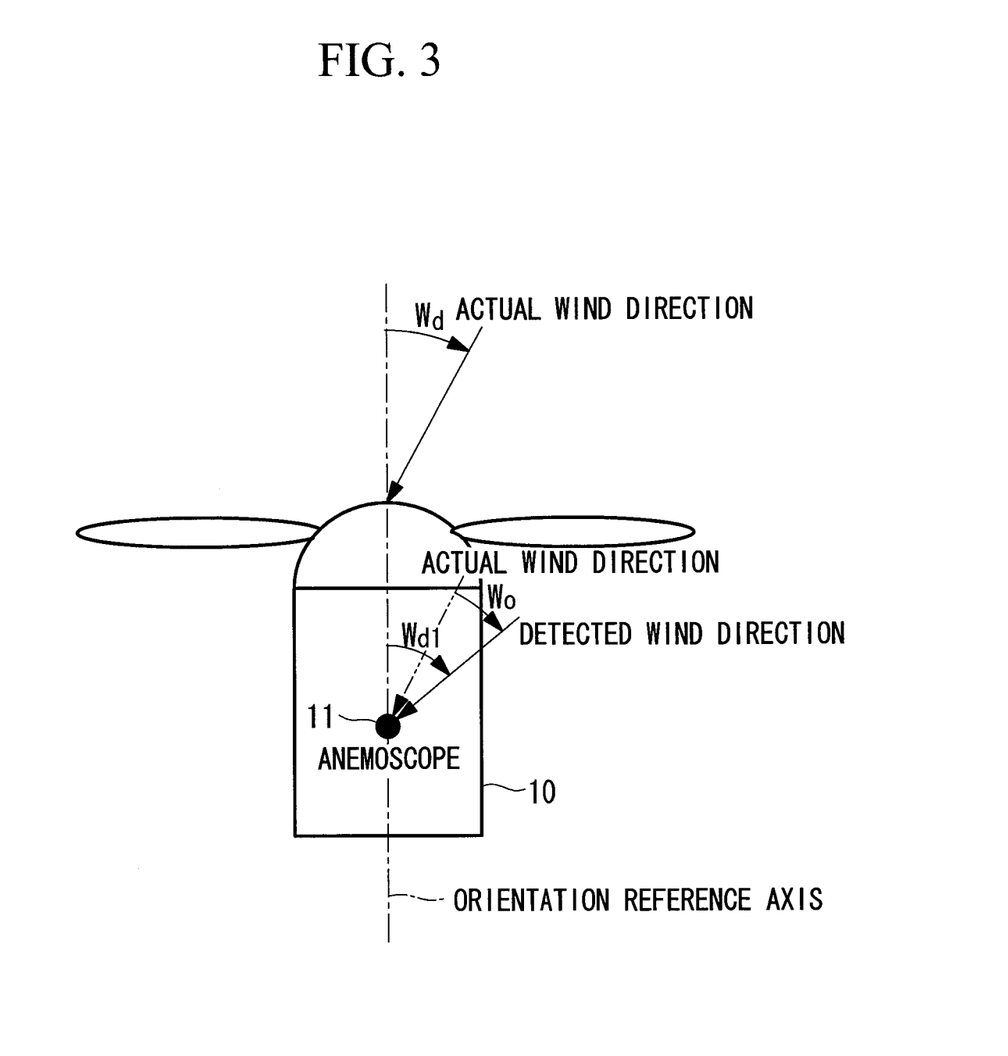
FIG. 3 is an explanatory diagram showing the relationship between the wind direction detected with an anemoscope, the actual wind direction, and the offset from the wind direction, according to the first embodiment of the present invention.

In step S31, first, a target wind speed $V_a$ at the time when the wind direction is estimated is selected. The deviation between the actual wind direction and the main wind direction, which the wind direction offset value, varies depending on the wind speed in a wind turbine generator in which the rotational speed of the blades corresponds to the wind speed, like the wind turbine generator according to this embodiment. Therefore, when estimating the actual wind direction, it is necessary to determine the target wind speed $V_a$ at the time when the wind direction offset value is assumed. This wind speed $V_a$ may be arbitrarily determined. Next, in step S32, the wind direction assuming unit 25 assumes the wind direction offset value at the wind speed $V_a$ selected in step S31 and assumes the actual wind direction on the basis of that wind speed. That is, as shown in FIG. 3, where $W_{d1}$ is the wind direction with respect to the orientation reference axis of the nacelle, which is detected by the anemoscope 11, and $W_o$ is the wind direction offset value, which is a deviation between the actual wind direction and the detected wind direction, the actual wind direction $W_d$ in front of the nacelle 10 is defined by the following expression, and the actual wind direction $W_d$ is assumed based on the expression.

$$W_d = W_{d1} - W_o \qquad \text{Expression 1}$$

It is necessary to assume several wind direction offset value to enable approximation to a quadratic curve in a subsequent step. Thus, in this embodiment, three values, namely, $W_o(1)=0°$, $W_o(2)=+10°$, and $W_o(3)=-10°$ are assumed. The actual wind directions corresponding to these values are assumed to be $W_d(1)$, $W_d(2)$, and $W_d(3)$, respectively.

In the following step S33, the average-generator-output-power calculation unit 26 calculates the average generator output powers for 10 minutes in the actual wind directions $W_d(1)$, $W_d(2)$, and $W_d(3)$ assumed in step S32, respectively. The process of calculating the average generator output powers is performed in accordance with the flowchart shown in FIG. 4, which is the subroutine in the flowchart in FIG. 2. That is, in step S41 in FIG. 4, when the nacelle is driven so as to follow the wind direction detected by the anemoscope 11, and when the wind turbine generator is in a state of generating power, first, for $W_d(1)$, the wind speed, the wind direction, and the generator output power are measured, and the measured data is stored in the storage device 24. In the following step S42, 10-minute averages are calculated from the data of the wind speed, wind direction, and generator output power measured in step S41 and are stored in the storage device 24.

Figure 4:
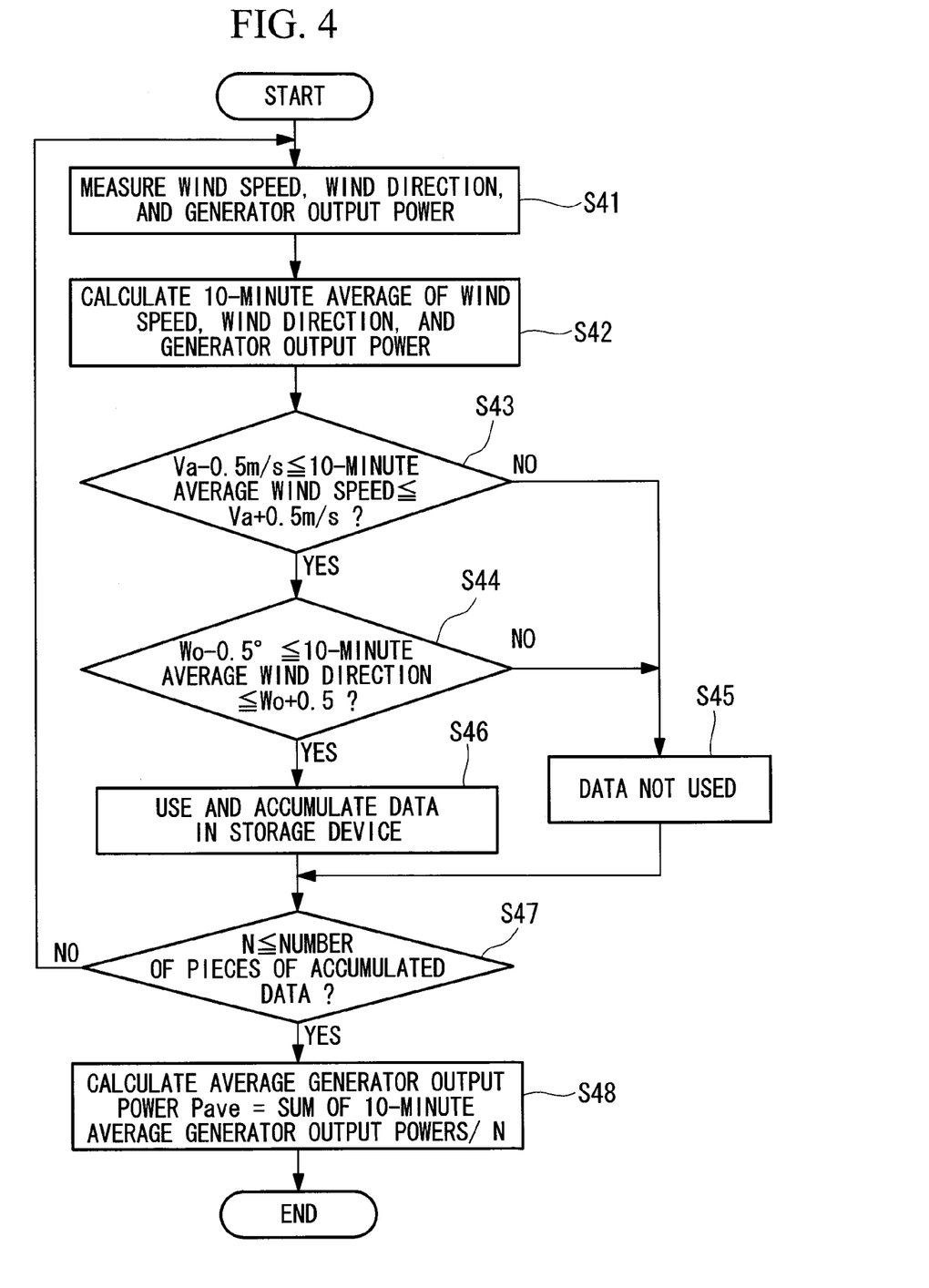
FIG. 4 is a flowchart showing a subroutine in step S33 of the flowchart in FIG. 2.

In the following steps S43 and S44, steps are repeated in which it is determined whether or not the data stored in the storage device 24 is intended data, and the data is employed if it is the intended data and is not employed if it is not the intended data. More specifically, in step S43, it is determined whether or not the average wind speed for 10 minutes from among the accumulated data is within ±0.5 m/s of the wind speed $V_a$ selected in step S31. When it is determined that the average wind speed for 10 minutes is within ±0.5 m/s of $V_a$, the process proceeds to the following step S44. Next, in step S44, it is determined whether or not the average wind direction for 10 minutes is within ±5° of the assumed actual wind direction $W_d(1)=0°$. When it is determined that the average wind direction for 10 minutes is within ±5° of the assumed actual wind direction $W_d(1)=0°$, the process proceeds to the following step S46, where the data is accumulated in the storage device 24 to be employed when the average generator output power is calculated. When it is determined that the data to be determined is out of the above range in steps S43 and S44, the process proceeds to the following step S45, where the data is not employed when the average generator output power is calculated.

In step S47, it is determined whether or not the number of pieces of data that has been determined to be employed in the preceding step S46 and stored again in the storage device 24 exceeds a predetermined number N. Herein, the predetermined number N may be arbitrarily selected such that optimization is possible when the average generator output power is calculated. When it is determined that a predetermined number of pieces of data employed when the average generator output power is calculated is not stored, the process returns to step S41, and the subsequent steps are repeated. When it is determined that a predetermined number of pieces of data employed when the average generator output power is calculated is stored, the process proceeds to the following step S48.

In step S48, the average of N pieces of the average generator output powers accumulated in the storage device 24 in step S46 is calculated. Using this average as the wind direction offset value $W_o(1)$, i.e., the average generator output power $P_{ave}(1)$ at the time when the assumed actual wind direction is $W_d(1)$, the subroutine of step S33, which is the processing of the flowchart in FIG. 4, is executed also on $W_o(2)$ and $W_o(3)$ to calculate $P_{ave}(2)$ and $P_{ave}(3)$.

Referring back to FIG. 2, in step S34, it is determined whether or not the average generator output powers with respect to all the wind direction offset value assumed in step S32 have been calculated. When, as a result of this determination, it is determined that the average generator output powers with respect to all the wind direction offset value have not yet been calculated, the process returns to step S33, where the subroutine of step S33 is repeated. When it is determined that the average generator output powers with respect to all the wind direction offset values $W_o(1)$, $W_o(2)$, and $W_o(3)$ have been calculated, the process proceeds to the following step S35, where $P_{ave}(1)$, $P_{ave}(2)$, and $P_{ave}(3)$ calculated with respect to the assumed wind direction offset values $W_o(1)$, $W_o(2)$, and $W_o(3)$ are approximated to a quadratic curve by the wind direction estimation unit 27. More specifically, using the least squares or polynomial approximation, factors $a_0$, $a_1$, and $a_2$ in the following expression are calculated.

$$P(i) = a_0 W_o(i)^2 + a_1 W_o(i) + a_2 \qquad \text{Expression 2}$$

Figure 5A:
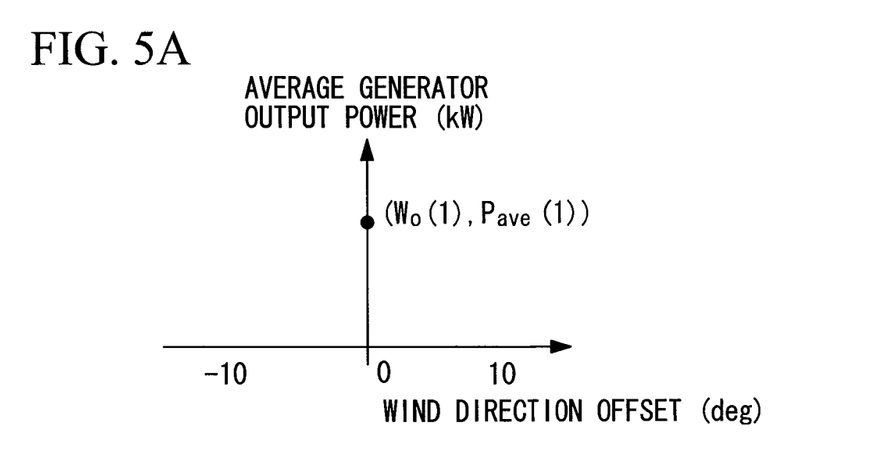
FIG. 5A is an explanatory diagram showing the process of generating an approximated curve according to the first embodiment of the present invention.
Figure 5B:
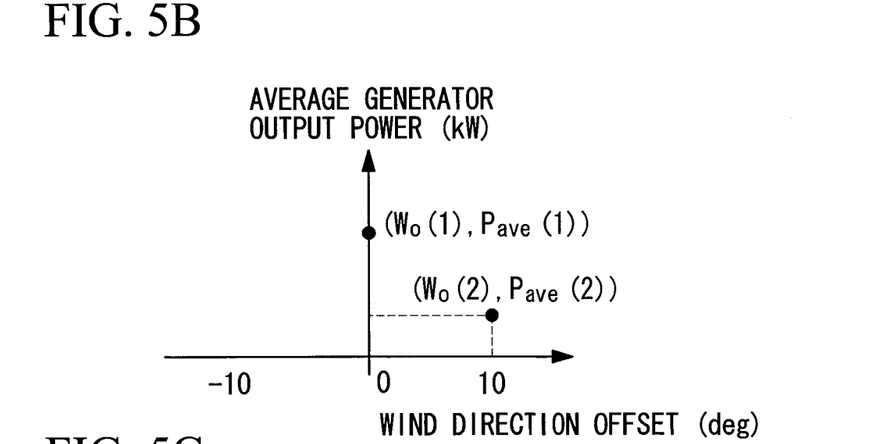
FIG. 5B is an explanatory diagram showing the process of generating the approximated curve according to the first embodiment of the present invention.
Figure 5C:
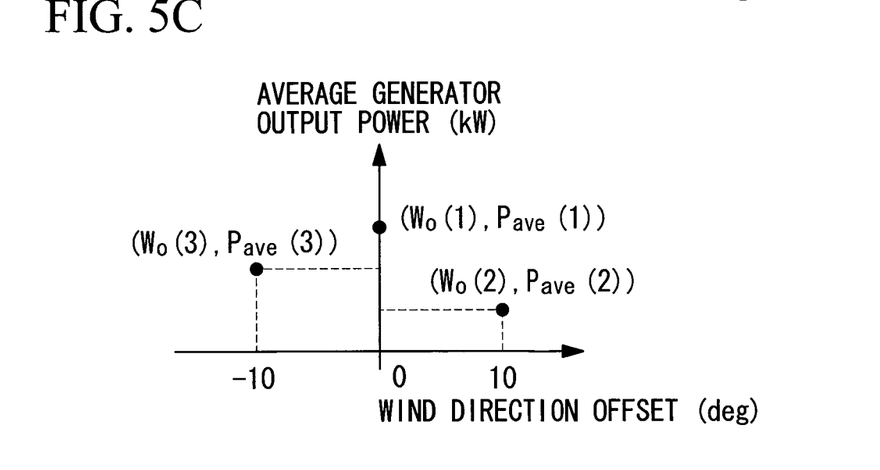
FIG. 5C is an explanatory diagram showing the process of generating the approximated curve according to the first embodiment of the present invention.
Figure 5D:
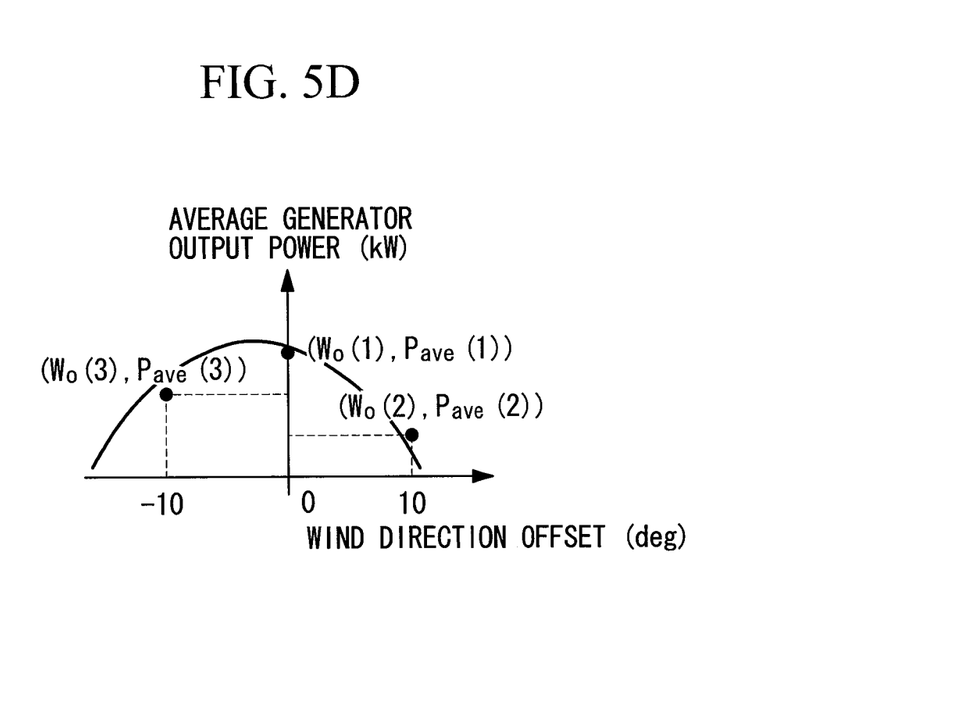
FIG. 5D is an explanatory diagram showing the process of generating the approximated curve according to the first embodiment of the present invention.
Figure 5E:
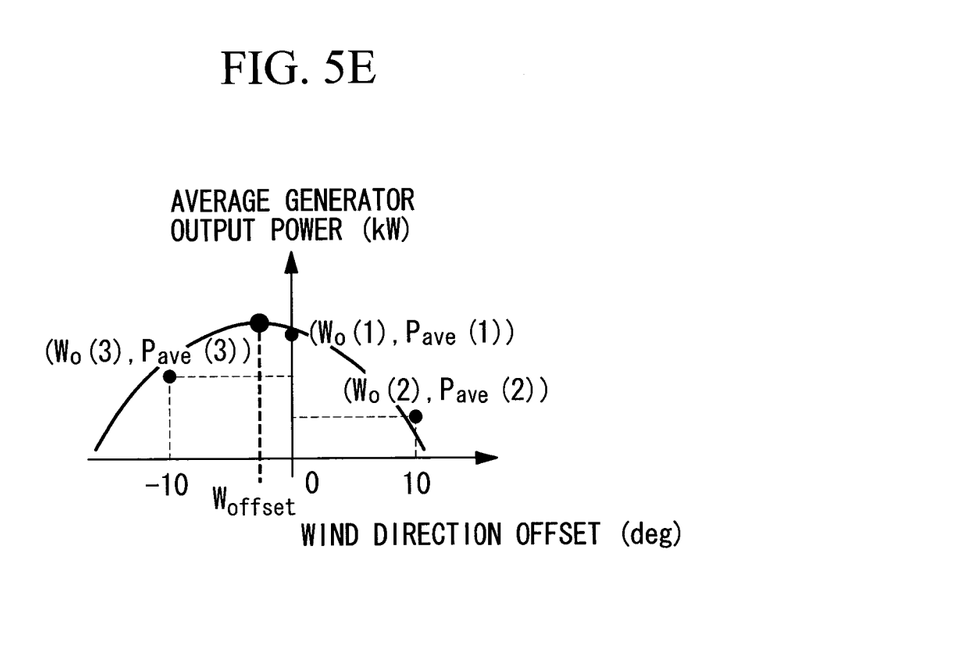
FIG. 5E is an explanatory diagram showing the process of generating the approximated curve according to the first embodiment of the present invention.

That is, as shown in FIGS. 5A to 5E, first, $(W_o(1), P_{ave}(1))$ is plotted in FIG. 5A, $(W_o(2), P_{ave}(2))$ is plotted in FIG. 5B, and $(W_o(3), P_{ave}(3))$ is plotted in FIG. 5C, sequentially. Then, based on the three points, a quadratic approximated curve is generated as shown in FIG. 5D. Then, using Expression 3, $W_o$ with which the generated approximated curve is largest is calculated (see FIG. 5E).

$$W_o(i) = -\frac{a_1}{2a_0} \qquad \text{Expression 3}$$

Next, in step S37, $W_o$ calculated in step S36 is substituted as the actual wind direction offset value $W_o$ in Expression 1 to estimate the actual wind direction $W_d$, thereby completing the processing of the method of estimating wind direction.

Although $W_o$ is a constant in this embodiment, $W_o$ may be a function of, for example, the wind speed, the rotational speed of the rotor, the rotational speed of the generator, the generator output power, or the like and may be given as a table that can be varied in accordance with the input. Furthermore, although the example in which three wind direction offset value $W_o$ are assumed to perform processing is shown above, it is not limited thereto. Also, when the average generator output power is calculated, it is not necessary to take the average for 10 minutes, and the design may be appropriately changed. In addition, although the wind speed, the wind direction, and the generator output power are measured to calculate the average generator output power from the measured data to estimate the actual wind direction in this embodiment, for example, data stored in advance may be used to estimate the actual wind direction. Estimation of the actual wind direction may be performed regularly or only once before the operation.

In this manner, according to the present invention, by estimating the actual direction of wind blowing against the wind turbine generator, yaw control can be performed such that the nacelle faces into the actual main wind direction. Thus, the power generating performance of the wind turbine generator improves.

Second Embodiment

Next, a second embodiment of the present invention will be described using FIGS. 6 and 7.

A wind turbine generator according to this embodiment has the same configuration as the first embodiment, but processing steps of the method of estimating wind direction are different. In the above-described first embodiment, a quadratic approximated curve is generated by deriving an approximate expression. In this embodiment, processing to generate an approximated curve using a gradient method will be described. FIG. 6 is a flowchart showing processing steps in the method of estimating wind direction according to this embodiment. Also in this processing step, described below, the target speed $V_a$ with respect to which the wind direction offset value $W_o$ is estimated is determined in advance, and the average generator output power at this speed $V_a$ is calculated.

Figure 6:
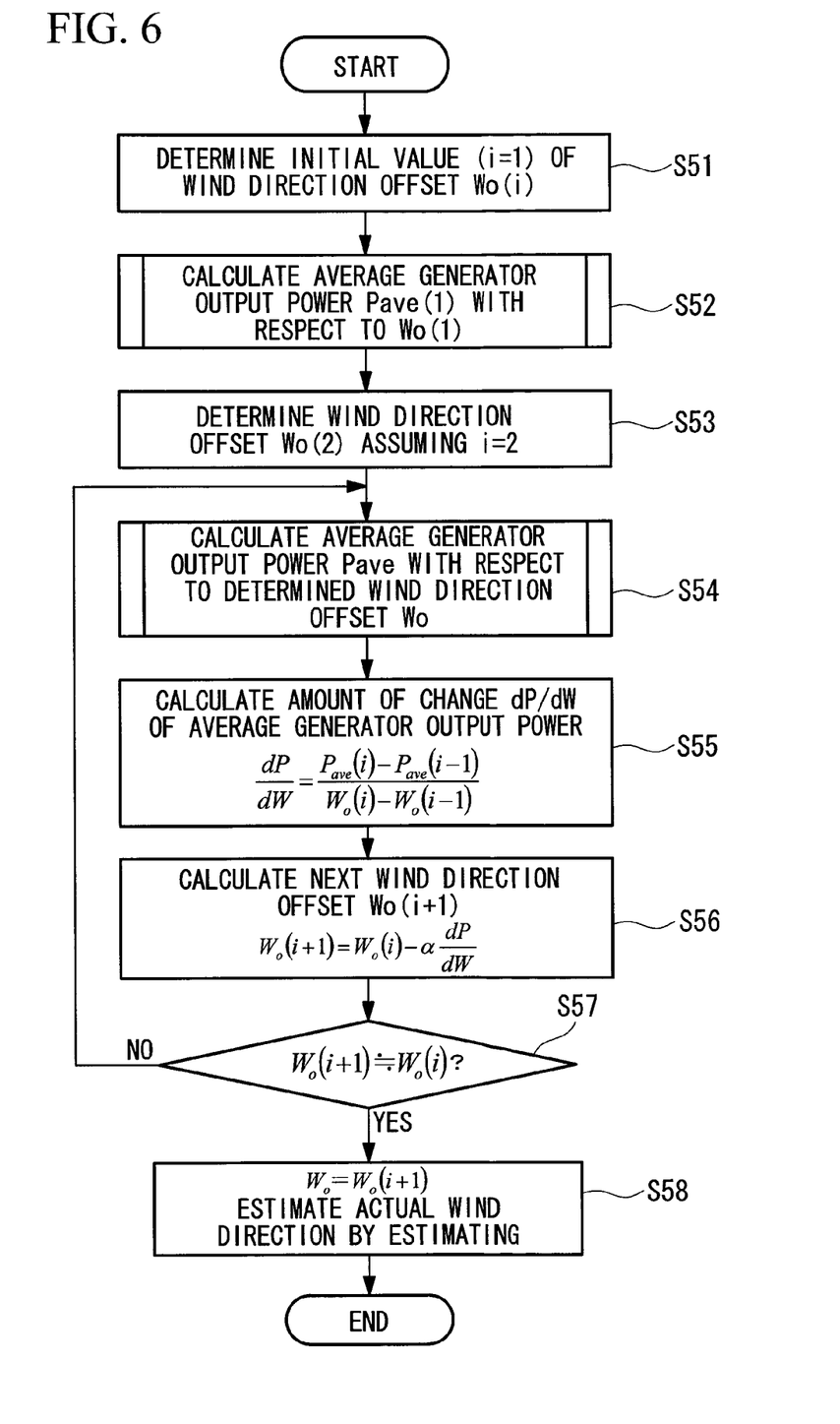
FIG. 6 is a flowchart showing wind-direction estimation processing according to a second embodiment of the present invention.
Figure 7:
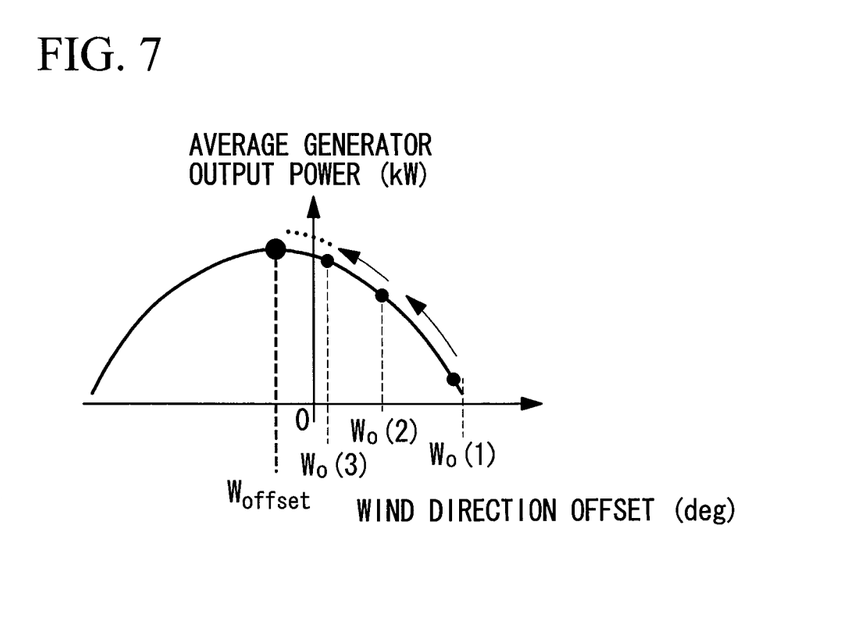
FIG. 7 is an explanatory diagram showing the process of generating an approximated curve according to the second embodiment of the present invention.

In step S51 in FIG. 6, the wind direction assuming unit 25 sets an initial value $W_o(1)$ of the wind direction offset value $W_o(i)$. Then, in the following step S52, the average-generator-output-power calculation unit 26 calculates the average generator output power $P_{ave}(1)$ with respect to $W_o(1)$. Since the calculation of the average generator output power in step S52 is the same as the calculation processing of the average generator output power in the above-described first embodiment (see step S33), the description thereof will be omitted. Next, in the following step S53, assuming i=2, the next wind direction offset value $W_o(2)$ is set, and, in step S54, the average generator output power $P_{ave}(2)$ with respect to $W_o(2)$ is calculated. Then, the process proceeds to the following step S55.

In step S55, the amount of change dP/dW between the average generator output power $P_{ave}(1)$ with respect to the wind direction offset value $W_o(1)$ and the average generator output power $P_{ave}(2)$ with respect to the wind direction offset value $W_o(2)$, obtained in advance, is calculated on the basis of Expression 4.

$$\frac{dP}{dW} = \frac{P_{ave}(2) - P_{ave}(1)}{W_o(2) - W_o(1)} \qquad \text{Expression 4}$$

In step S56, the next wind direction offset value $W_o(3)$ is calculated on the basis of Expression 5.

$$W_o(2) = W_o(1) - \alpha \frac{dP}{dW} \qquad \text{Expression 5}$$

Herein, α is a parameter that determines the convergence speed of $W_o$ and needs to be arbitrarily determined within the range from 0 to 1. If α is too small, the number of calculations required to reach convergence increases, and if α is too large, convergence may be impossible. Thus, it is preferable that a value determined in advance on the basis of an empirical rule of the gradient method be used.

Furthermore, in the following step S57, it is determined whether or not $W_o(3) \approx W_o(2)$, i.e., the next wind direction offset value $W_o(3)$ calculated on the basis of Expression 5 is a value that can be approximated to the wind direction offset value $W_o(2)$. When it is determined that the approximation is impossible, the process returns to step S54, and the above-described processing is repeated. More specifically, in step S54, the average generator output power $P_{ave}(i)$ with respect to the next wind direction offset value $W_o(i)$ calculated in step S56 is calculated, and, in the following step S55, the amount of change between the $P_{ave}(i)$ and the $P_{ave}(i-1)$, which has been calculated in advance, is calculated on the basis of Expression 6.

$$\frac{dP}{dW} = \frac{P_{ave}(i) - P_{ave}(i-1)}{W_o(i) - W_o(i-1)} \qquad \text{Expression 6}$$

Then, in the following step S56, using the amount of change calculated here, the next wind direction offset value $W_o(i+1)$ is calculated again on the basis of Expression 7, and, in step S57, it is determined whether or not the calculated wind direction offset value $W_o(i+1)$ is $W_o(i+1) \approx W_o(i)$.

$$W_o(i+1) = W_o(i) - \alpha \frac{dP}{dW} \qquad \text{Expression 7}$$

The above-described processing is repeated until it is determined that $W_o(i+1) \approx W_o(i)$, and when it is determined to be $W_o(i+1) \approx W_o(i)$, in the following step S58, $W_o(i+1)$ is set as the actual wind direction offset value $W_o$. That is, an approximated curve generated from the amount of change obtained in the above-described processing is shown in FIG. 7. Herein, if the amount of change of the average generator output power is a very small negligible value, then $W_o(i+1) \approx W_o(i)$. At this time, in the curve in FIG. 7, $P_{ave}(i)$ takes the maximum value. By determining the wind direction offset value $W_o(i+1)$ at this time to be the actual wind direction offset value $W_o$ and substituting it in Expression 1, the actual wind direction $W_d$ is estimated, thereby completing the processing of the method of estimating wind direction.

In this manner, according to the present invention, by estimating the actual direction of wind blowing against the wind turbine generator, yaw control can be performed such that the nacelle faces into the actual main wind direction. Thus, the power generating performance of the wind turbine generator improves.

Figure 8:
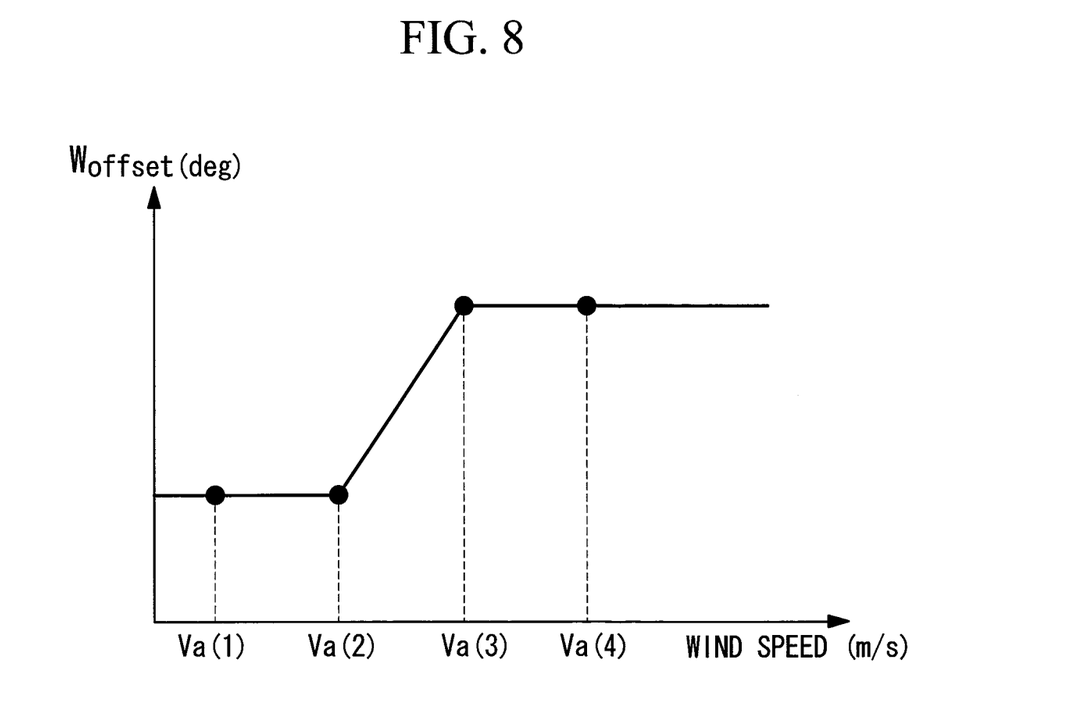
FIG. 8 is a diagram showing a reference example of a table of wind direction offset values calculated using the method of estimating wind direction of the present invention.

As shown in FIG. 8, it is possible to form a table that can be varied in accordance with the wind speed in advance, by setting several wind speeds $V_a$, for example, from $V_a(1)$ to $V_a(4)$, and estimating the actual wind direction offset values with respect to the set wind speed using the above-described method of estimating wind direction.

| {Reference Signs List} | |
|---|---|
| 10 | nacelle |
| 11 | anemoscope |
| 20 | calculation unit |
| 21 | CPU |
| 22 | ROM |
| 23 | RAM |
| 24 | storage device |
| 25 | wind direction assuming unit |
| 26 | average-generator-output-power calculation unit |
| 27 | actual wind direction estimation unit |

The invention claimed is:

1. A wind turbine generator in which an orientation of a nacelle is variably controlled so as to follow a wind direction, the wind turbine generator comprising:
   a wind direction detecting means that detects a main wind direction;
   a wind direction assuming means that assumes an actual wind direction, which is a direction of wind which blows in actual use, by assuming a wind direction offset value, which is a deviation between the main wind direction and the actual wind direction, at a predetermined wind speed;
   an average-generator-output-power calculation means that calculates an average generator output power for a predetermined period of time in the actual wind direction which has been assumed; and
   an actual wind direction estimation means that estimates the actual wind direction by approximating the average generator output power with respect to the wind direction offset value which has been assumed to a quadratic curve and estimating the wind direction offset value at the time when the average generator output power is the maximum in the quadratic curve which has been approximated to be an actual offset value.

2. A method of estimating wind direction in a wind turbine generator in which an orientation of a nacelle is variably controlled so as to follow a wind direction, the method comprising:

a step of detecting a main wind direction;

a step of assuming an actual wind direction, which is a direction of wind which blows in actual use, by assuming a wind direction offset value, which is a deviation between the main wind direction and the actual wind direction, at a predetermined wind speed;

a step of calculating an average generator output power for a predetermined period of time in the actual wind direction which has been assumed; and a step of estimating the actual wind direction by approximating the average generator output power with respect to the wind direction offset value which has been assumed to a quadratic curve and estimating the wind direction offset value at the time when the average generator output power is the maximum in the quadratic curve which has been approximated to be an actual offset value.

* * * * *